United States Patent
Wright et al.

(10) Patent No.: US 11,169,903 B2
(45) Date of Patent: *Nov. 9, 2021

(54) RISK-BASED SOFTWARE VALIDATION AND CHANGE CONTROL

(71) Applicant: MASTERCONTROL, INC., Salt Lake City, UT (US)

(72) Inventors: Erin Marie Wright, Philadeplhia, PA (US); Derek Edward Cramer, Herriman, UT (US); Robert Edward Thomas, Kaysville, UT (US); Chad Milito, Ogden, UT (US); Terrance Holbrook, Bountiful, UT (US); Alexander James Butler, Sandy, UT (US)

(73) Assignee: MASTERCONTROL, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,531

(22) Filed: Oct. 30, 2020

(65) Prior Publication Data

US 2021/0049088 A1 Feb. 18, 2021

Related U.S. Application Data

(63) Continuation of application No. 16/881,862, filed on May 22, 2020, now Pat. No. 10,872,026, which is a
(Continued)

(51) Int. Cl.
*G06F 11/36* (2006.01)
*G06F 8/65* (2018.01)
*G06Q 10/06* (2012.01)

(52) U.S. Cl.
CPC ........... *G06F 11/3608* (2013.01); *G06F 8/65* (2013.01); *G06Q 10/0635* (2013.01)

(58) Field of Classification Search
None
See application file for complete search history.

(56) References Cited

U.S. PATENT DOCUMENTS 7,359,865 B1 * 4/2008 Connor ................. G06Q 40/08
705/7.28
8,925,092 B1 * 12/2014 Johansson ........... H04L 63/1433
726/25

(Continued)

*Primary Examiner* — Philip Wang
(74) *Attorney, Agent, or Firm* — Workman Nydegger (57) ABSTRACT

Embodiments are directed to performing risk-based software validation and to applying change control when upgrading a software application. In one scenario, a computer system calculates a risk score for features in a software application. This risk score indicates a relative level of risk for installing and using the software application. The computer system performs internal usage testing to determine how the software application is recommended for use, and conducts use tests to determine how a specified client uses the features of the software application as compared to the determined recommended use. Then, based on the calculated risk and the determined use of the features, the computer system provides a recommendation for the specified client indicating which portions of the software application are to undergo client-specific validation. In another scenario, a computer system applies change control when upgrading a software application from a first version to a second version.

20 Claims, 6 Drawing Sheets

Related U.S. Application Data continuation of application No. 16/153,431, filed on Oct. 5, 2018, now Pat. No. 10,664,380.

(60) Provisional application No. 62/655,578, filed on Apr. 10, 2018.

(56) References Cited

U.S. PATENT DOCUMENTS

| | | | |
|---|---|---|---|
| 9,229,902 B1* | 1/2016 | Leis | H04L 41/0866 |
| 2007/0240102 A1* | 10/2007 | Bello | G06F 11/3672 |
| | | | 717/104 |
| 2008/0250323 A1* | 10/2008 | Huff | G06F 9/453 |
| | | | 715/733 |
| 2015/0120742 A1* | 4/2015 | Liu | G06Q 30/02 |
| | | | 707/740 |
| 2015/0227452 A1* | 8/2015 | Raghavan | G06F 11/3684 |
| | | | 717/124 |
| 2016/0026635 A1* | 1/2016 | Kunapuli | G06Q 10/0637 |
| | | | 707/748 |
| 2017/0244746 A1* | 8/2017 | Hawthorn | G06F 21/55 |
| 2018/0352091 A1* | 12/2018 | Puri | H04M 7/0036 |
| 2019/0138431 A1* | 5/2019 | Holbrook | G06F 8/65 |
| 2019/0179953 A1* | 6/2019 | Kline | G06F 16/9535 |
| 2019/0205542 A1* | 7/2019 | Kao | G06Q 10/0635 |
| 2019/0294528 A1* | 9/2019 | Avisror | G06F 8/60 |
| 2019/0294536 A1* | 9/2019 | Avisror | G06F 11/3688 |
| 2019/0310929 A1* | 10/2019 | Wright | G06F 8/65 |

\* cited by examiner

RISK-BASED SOFTWARE VALIDATION AND CHANGE CONTROL

CROSS-REFERENCE TO RELATED APPLICATIONS

This application is a continuation of U.S. Utility application Ser. No. 16/881,862, entitled "RISK-BASED SOFTWARE VALIDATION AND CHANGE CONTROL," filed on May 22, 2020, which application is a continuation of U.S. Utility application Ser. No. 16/153,431, entitled "RISK-BASED SOFTWARE VALIDATION AND CHANGE CONTROL," filed Oct. 5, 2018 (now U.S. Pat. No. 10,664,380 issued May 26, 2020,) which claims priority to and the benefit of U.S. Provisional Application Ser. No. 62/655,578 entitled "RISK-BASED SOFTWARE VALIDATION AND CHANGE CONTROL," filed on Apr. 10, 2018. All of the aforementioned applications are incorporated by reference herein in their entirety.

BACKGROUND

Various governments exert regulatory control over companies within their jurisdictions. In particular, pharmaceutical companies and manufacturers, medical device makers, and clinical research organizations are all subject to compliance regulations. These compliance regulations ensure that the companies are producing items that are safe for patients. For example, software applications used in the production of specific medical items need to undergo validation to ensure that they function as intended. These software validations can take anywhere from days to weeks to months. As such, they can be a great burden on these companies. Further still, the many government agencies around the world do not specify how the validations are to be performed. As such, many software features that could get by with minimal testing are often unnecessarily tested to the fullest extent. This testing results in an obstacle to the roll-out of software applications that would otherwise benefit society as a whole by increasing efficiency in the production of medical devices, pharmaceuticals, and other related medical items.

BRIEF SUMMARY

Embodiments described herein are directed to performing risk-based software validation and to applying change control when upgrading a software application. In one embodiment, a computer system calculates a risk score for components in a software application. This risk score indicates a relative level of risk for installing and using the software application based on the company's intended usage. The computer system supplier performs internal data assessments to determine how the software application is recommended for use, and conducts use tests based on these recommendations. The computer system is used to determine how a specified client uses the components of the software application as compared to the determined recommended use. Then, based on the calculated risk, the internal testing mitigations, and the determined use of the features, the computer system provides a recommendation for the specified client indicating which portions of the software application are to undergo client-specific usage validation.

In another embodiment, a computer system applies change control when upgrading a software application. The computer system compares first and second versions of a software application to identify differences in features and functionality between the first and second versions. The computer system then determines whether the identified differences affect software modules or features that are integrated in the application beyond a threshold amount. The computer system performs internal usage testing to determine how the first version and the second version of the application is recommended for use and, based on the identified level of integration and based on the usage testing results, determines which portions of the second version of the application should undergo client-specific usage validation. The computer system then recommends the identified portions of the second version of the application for additional client-specific usage validation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to performing risk-based software validation and to applying change control when upgrading a software application. In one embodiment, a computer system calculates a risk score for features in a software application. This risk score indicates a relative level of risk for installing and using the software application. The computer system performs internal usage testing to determine how the software application is recommended for use, and conducts use tests to determine how a specified client uses the features of the software application. The computer system is used to compare how a specific client uses the feature against the determined recommended use. Then, based on the calculated risk and the determined use of the features, the computer system provides a recommendation for the specified client indicating which portions of the software application are to undergo client-specific validation.

In another embodiment, a computer system applies change control when upgrading a software application. The computer system compares first and second versions of a software application to identify differences in features and functionality between the first and second versions. The computer system then determines whether the identified differences affect software modules or features that are integrated in the application beyond a threshold amount. The computer system supplier performs internal usage testing to determine how the first version of the application is recommended for use and, based on the identified level of integration and based on the internal usage testing results, determines which portions of the second version of the application should undergo client-specific validation. The computer system then recommends the identified portions of the second version of the application for client-specific usage validation.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
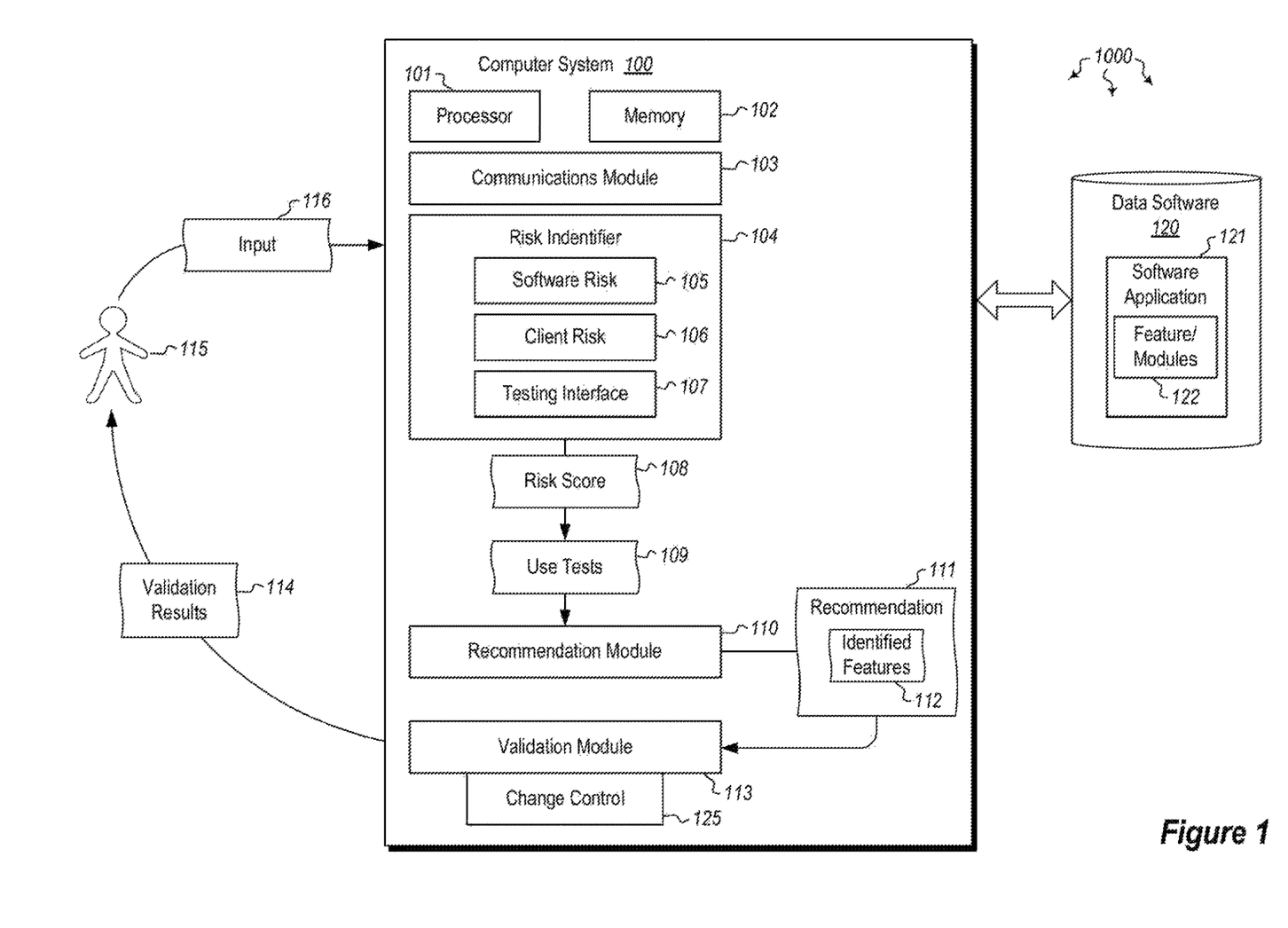
FIG. 1 illustrates a computer architecture in which embodiments described herein may operate including performing risk-based software validation and applying change control when upgrading a software application.

Referring to the figures, FIG. 1 illustrates a computer architecture 1000 in which at least one embodiment described herein may be employed. The computer architecture 1000 includes a computer system 100. The computer system 100 includes at least one processor 101 and at least some system memory 102. The computer system 100 may be any type of local or distributed computer system, including a cloud computer system. The computer system 100 includes modules for performing a variety of different functions. The program modules may be hardware-based, software-based, or a combination thereof. Each program module uses computing hardware and/or software to perform functions including those defined herein below.

For instance, communications module 103 may be configured to communicate with other computer systems. The communications module 103 may include any wired or wireless communication means that can receive and/or transmit data to or from other computer systems. The communications module 103 may be configured to interact with databases, mobile computing devices (such as mobile phones or tablets), embedded or other types of computer systems.

The processor 101 (alone or in conjunction with the risk identifier module 104) may be configured to calculate a risk score 108 for one or more features 122 in a software application 121. For example, the risk identifier 104 may identify different types of risk (including software risk 105 and client risk 106) in relation to the features and/or modules 122 of software application 121.

The software application 121 may be stored in data store 120, which may be local or remote to computer system 100. The risk score 108 may indicate a relative level of risk for installing and using the software application 121. A software risk 105 may indicate multiple different things including the degree to which a specified software component is included in a best practice configuration for the software application, the degree to which a failure of this software component would prevent standard usage of the software application, and/or the degree to which the software component was tested during software operation functional testing. This software risk may combine the various types of risk into a single score or rating.

Similarly, the client risk 106 may indicate an amount of variation from a specified set of best practices for software application usage, an amount of regulatory sensitivity, a subjective risk assessment performed by the client, and/or the degree of risk mitigation by internal usage testing. Any of these risk measures may be used alone or in combination to indicate how much risk the client will be exposed to if the client moves from a first version of the application to a second version.

In at least one embodiment, the user enters a number that represents the amount of variation from a specified set of best practices for software application usage. The number may be selected from a scale of numbers that indicates the amount of variation. The scale of numbers may relate to a preset scaling that is provided with a particular piece of software such that a user can reference the preset scaling to determine an appropriation number to describe the amount of variation.

Additionally, in at least one embodiment, each software application is capable of, at least in part, generating its own number representative of variation from best practices. For example, each software application may be associated with a self-audit feature that examines the installed software application to determine if best practices are in place. For example, the self-audit feature may determine whether the best practice of requiring a two-factor authentication is in place. In the case that two-factor authentication is not in place, the self-audit feature can account for this lack of best practices in generating a final number.

Additionally, in at least one embodiment, the self-audit feature is configured to automatically weight different best practices differently. For instance, some best practices may be in place simply to speed up processes, while other best practices may be in place to avoid security breaches. In such a case, the self-audit feature weights lack of security best practices greater than the lack of best practices that simply speed up processes.

As mentioned above, in at least one embodiment, the client risk 106 may also indicate an amount of regulatory sensitivity associated with a particular feature 122. For example, different software features 122 may be used across a wide swath of different industries and may also be used in different ways by different organizations. In some uses, the feature 122 may directly relate to a function that is heavily regulated, whereas other uses of the feature may relate to a function that is lightly regulated or not regulated at all.

In at least one embodiment, the user enters a number that represents the regulatory sensitivity of the feature from a scale of numbers that indicates the relative regulatory sensitivity of a feature. The scale of numbers may relate to a preset scaling that is provided with a particular piece of software such that a user can reference the preset scaling to determine an appropriation number to describe the regulatory sensitivity Additionally, in at least one embodiment, each software application is capable of, at least in part, generating its own number representative of the regulatory sensitivity. For example, each software application may be associated with a self-audit feature that examines the installed software application to determine if features are being used in manners that invoke regulatory oversight. For example, the self-audit feature may scan content that access by a particular feature and identify the type of information being passed through a particular feature. For instance, the self-audit feature may determine that an "export feature" is being used to export data that contains personal medical records. Based upon this determination, the self-audit feature may rate the "export feature" as having a high regulatory sensitivity. In contrast, the self-audit feature may determine the particular "export feature" is only used to create locally-stored backups of data. Based upon this determination, the self-audit feature may rate the "export feature" as having a low-to-medium regulatory sensitivity because the backups are only stored locally and while backups are required by regulation, there is no strong regulatory regime regarding the backup mechanism.

The software risk 105 and the client risk 106 may be sent individually or may be combined into the risk score 108. The risk score 108 is then sent to the testing interface 107. Additionally, within the risk identifier 104, the testing interface 107 is configured to perform internal usage testing to determine how the software application is recommended for use. As used herein, the term "internal" refers to the manufacturer of the software. When developers create software applications, they typically design the applications with recommended uses. Thus, the testing interface may perform internal usage testing to determine how the software is to be used by the customer or end user (which may be one in the same).

Once the internal tests have been performed, the testing interface 107 computer system 100 may conduct use tests 109 to determine how a specified client actually uses the features 122 of the software application 121, as compared to the determined recommended use. For instance, in at least one embodiment, each feature in a software application is associated with storage object. Each time a feature is used, software code associated with the feature updates the storage object to increment a feature usage counter and to register a function that called the feature. As such, over time each feature is associated with a storage object that indicates the number of times the feature was used and the function(s) that called the feature. Using these numbers and information, the software application can provide information that readily makes it easy to determine which features are heavily used and what functions call those features.

In practice, many customers use applications for functions that were not intended by the application developer, or in ways that are not exactly in line with the developer's recommended use. The use tests 109 determine how the software application 121 is actually being used by that client (e.g. 115). Some clients will use a particular feature and, for that client, that feature provides a critical feature that needs to be validated. While other clients may use that same feature, but to them the feature is merely useful, but not critical. Still other clients may not use the feature at all. Thus, actual usage of each feature is to be determined before recommending features for validation. Indeed, each feature that can reasonably avoid client specific validation for a given client may save a great deal of client time, processing time, memory space, network bandwidth, and other computing resources.

The recommendation module 110 of computer system 100 receives the results of the testing interface 107 use test 109 and the risk score 108 and provides a recommendation 111 on which identified features 112 should be validated by the client usage. Thus, based on the calculated risk score 108 and the determined use (according to use tests 109) of the features, the recommendation module 110 generates a recommendation 111 for the specified client 115 indicating which identified features 112 of the software application 121 are to undergo client-specific validation.

The validation module 113 then performs the software validation for those identified features, and provides the validation results 114 to the client 115. Optionally, the client may provide input 116 that manually adds or removes features to or from the software validation. These concepts will be explained further below with regard to the embodiments illustrated in FIGS. 2-4, and the methods 500 and 600 of FIGS. 5 and 6, respectively.

Figure 5:
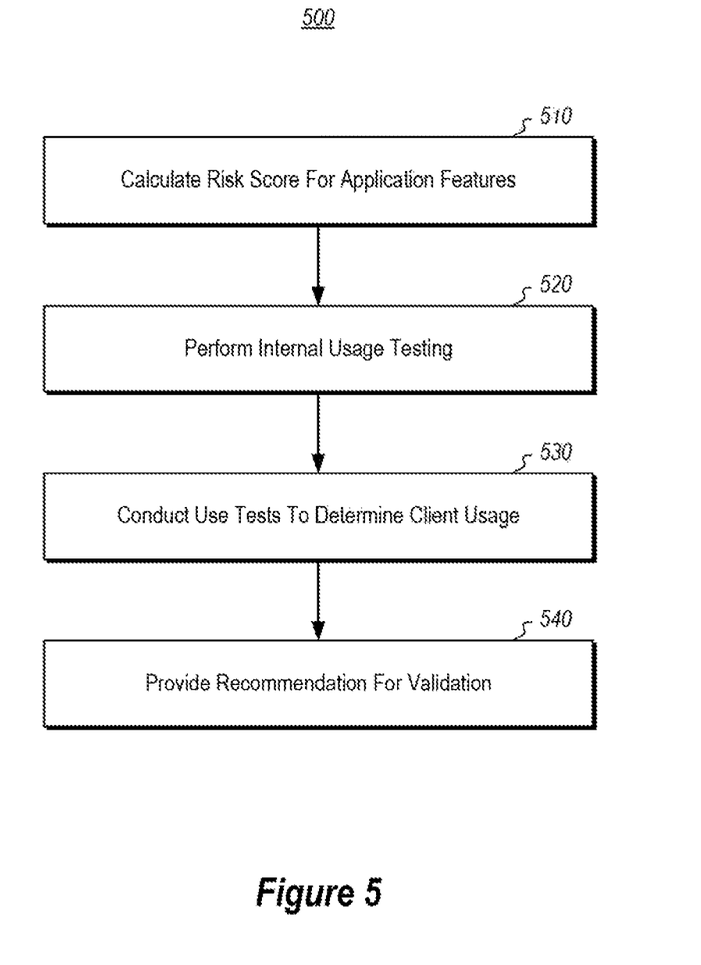
FIG. 5 illustrates a flowchart of an example method for performing risk-based software validation.
Figure 6:
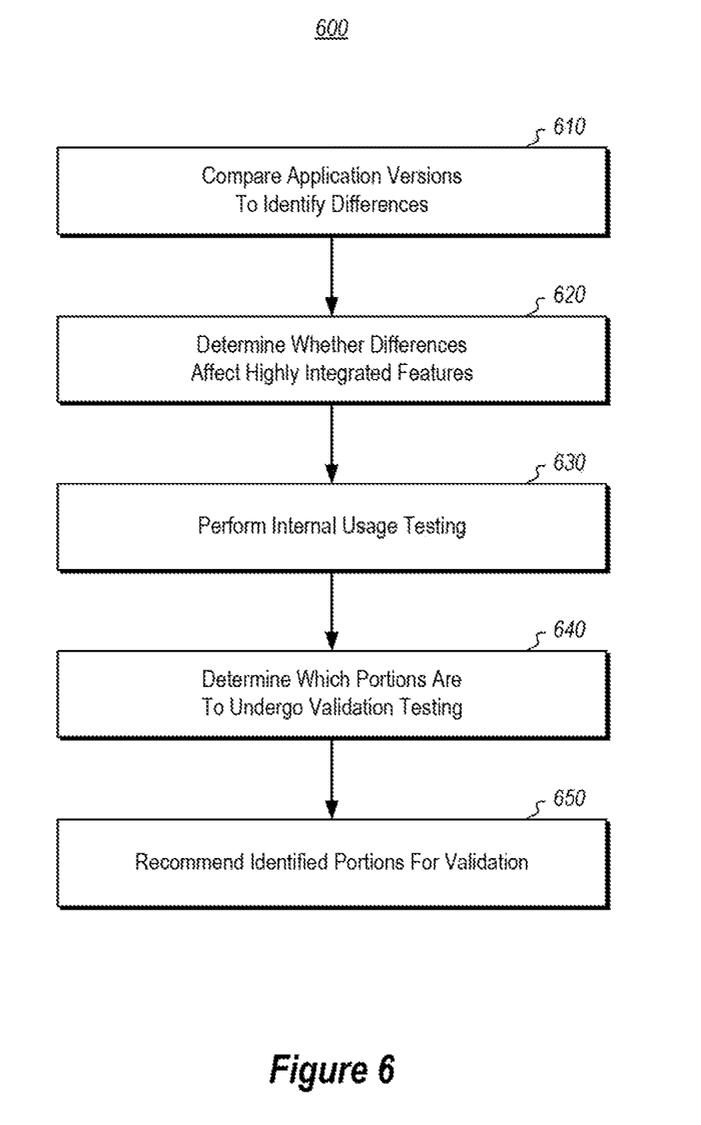
FIG. 6 illustrates a flowchart of an example method for applying change control when upgrading a software application.

In view of the systems and architectures described above, methodologies that may be implemented in accordance with the disclosed subject matter will be better appreciated with reference to the flow charts of FIGS. 5 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 2:
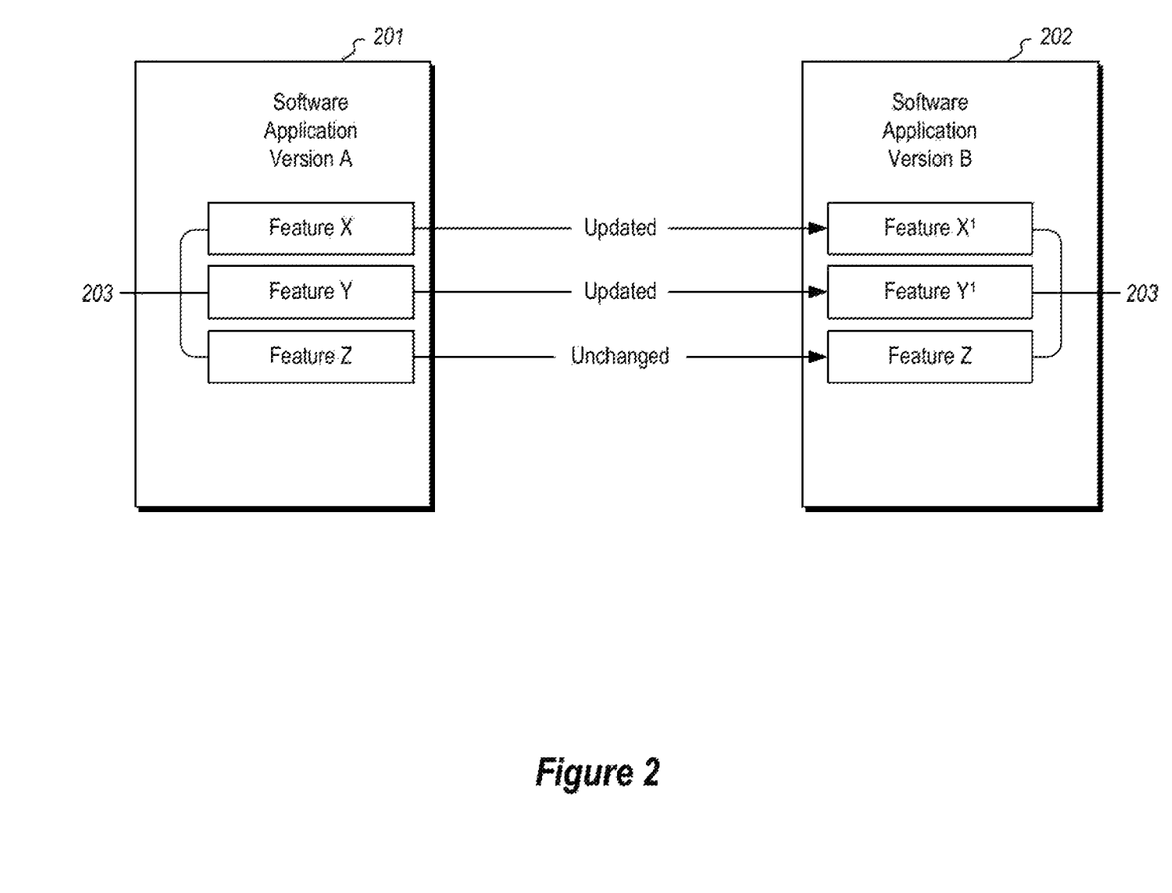
FIG. 2 illustrates an embodiment in which a software application is updated from a first version to a second version.

FIG. 2 illustrates an embodiment in which a software application version A (201) is updated to version B (202). In the update from version A to version B, some features 203 are updated, while others are not. For example, feature X has been updated to feature X'. Similarly, feature Y has been updated to feature Y'. However, feature Z has not been changed between versions. Thus, it is likely that feature Z may not need to undergo client specific validation in version B. However, if feature Z is sufficiently connected to other modules or features, it may still be validated. Moreover, if a given client heavily uses and relies on feature Z, it may be advisable to still validate that feature, as changes to other modules or features may affect feature Z.

In at least one embodiment, the computer system 100 is configured to automatically identify updated features within a software application. For example, in at least one embodiment, each individual feature may be associated with a unique executable within the software application version A (201). Once software application version B (202) is installed, the computer system 100 can perform a hash of each individual executable within the software application version B (202). The resulting hashes can be compared with similar hashes taken from software application version A (201). Any differences in the resulting hashes can be associated with updated features.

In an additional or alternative embodiment, the computer system 100 can identify updated features through variables associated with each executable within software application version A (201) and software application version B (202).

For example, each executable may be associated with a public variable that indicates a version number of the associated executable. The computer system 100 can read the version number associated with each executable in software application version B (202) and compare is to the version numbers associated with software application version A (201).

Further, in at least one embodiment, the computer system 100 can then access a remote database and download a list of changes associated with each version change within the individual executables. For example, there may have been a multiple version jump between Feature X in software application version A (201) and Feature X' in software application version B (202). Using the information in the remote database, the computer system 100 can identify all of the changes to the executable that occurred between Feature X and Feature X'. In at least one embodiment, such changes may also include actual source code changes. One will appreciate that the ability to identify what features in a software application were updated and to identify the actual changes that occurred provides significant technical advantage in the field of software validation.

Figure 3:
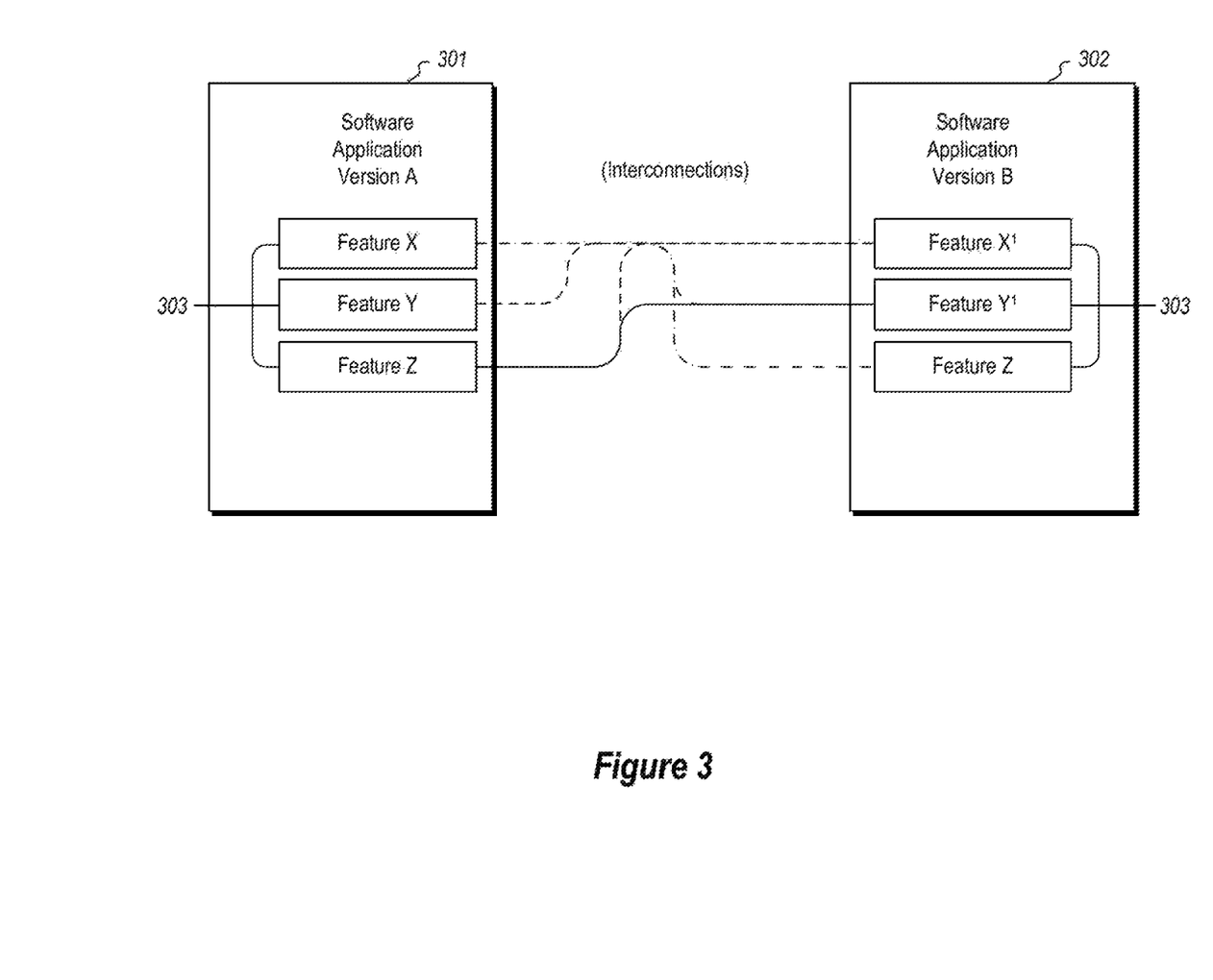
FIG. 3 illustrates an embodiment in which interconnections are identified between two versions of a software application.

Indeed, as shown in FIG. 3, if software application version A (301) has three features 303 (features X, Y, and Z), each of these features may be interconnected to other features within version A and/or within version B (302). Thus, as shown, feature X is interconnected with feature Z, feature Y is interconnected with feature X', and feature Z is interconnected with both feature X' and feature Y'. Of course, many other features and interconnections may exist within any given software application. As used herein, the term "interconnection" may refer to any link, call, function, routine, variable, library or other software element that is shared, used or affected by other software features. Thus, if two software features or modules both use a shared library, or shared functions, and these libraries or functions are updated, the two can be said to be interconnected. This may raise the likelihood that these features are recommended for validation.

Figure 4:
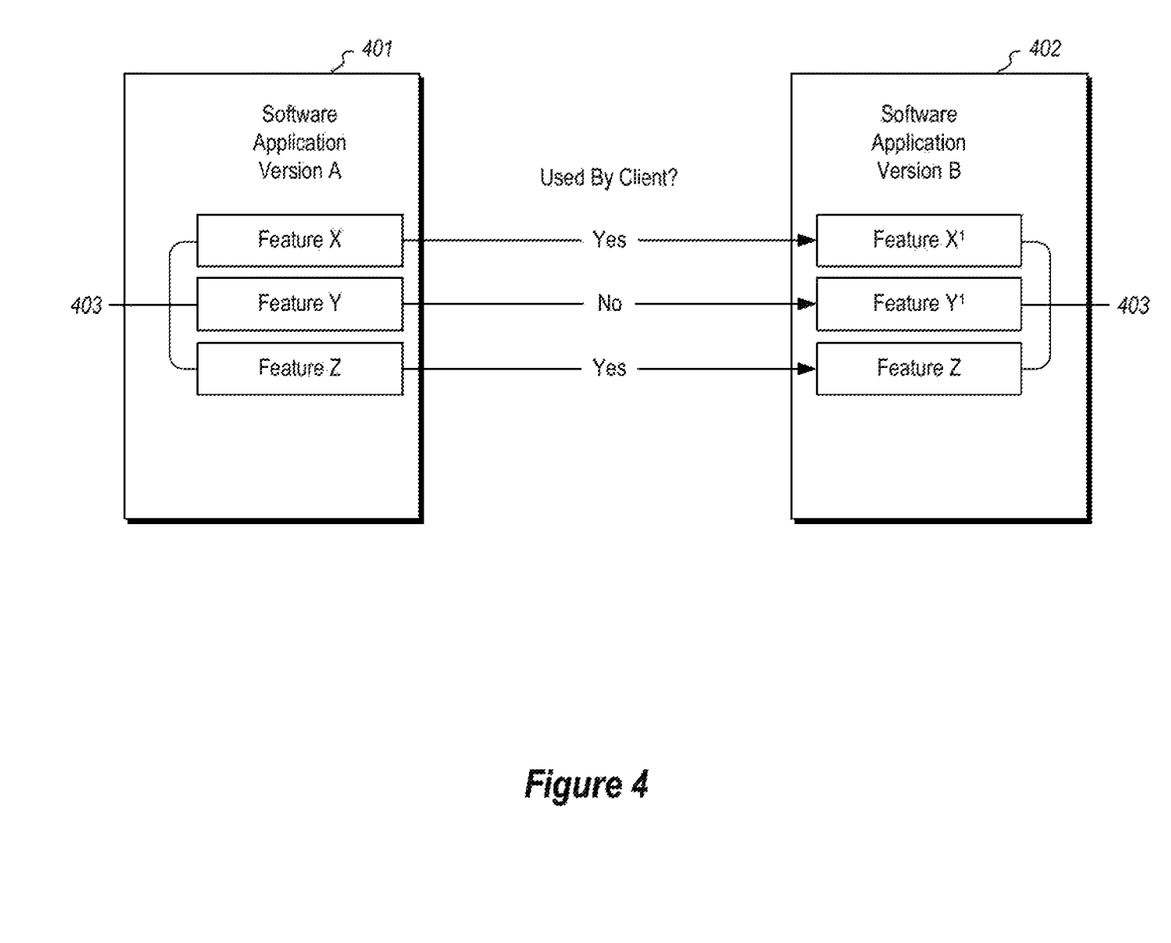
FIG. 4 illustrates an embodiment in which feature use by clients is identified between two versions of a software application.

FIG. 4 illustrates an example in which usage is determined for different versions of a software application. For instance, if a client (e.g. 115 of FIG. 1) uses feature X (of features 403), and also uses updated feature X' of software application version B (402), then it is much more likely that that feature will be recommended for validation. Type of use as well as extent of use may also be factors when making the recommendation to validate or not. In FIG. 4, features Y and Y' are not used by the client, but feature Z is used. Thus, even though feature Z was not updated between versions, because it is used by the client, the recommendation module 110 of computer system 100 may recommend that that feature be validated. Moreover, because features X and X' are used by the client, and have been updated between versions, there is an even higher likelihood that feature X' will be recommended for validation.

To better illustrate the process of performing risk-based software validation, FIG. 5 illustrates a flowchart of a method 500 for performing such validation. The method 500 will now be described with frequent reference to the components and data of environment 1000 of FIG. 1, as well as the embodiments in FIGS. 2-4.

Method 500 includes calculating a risk score for one or more features in a software application, the risk score indicating a relative level of risk for installing and using the software application (510). For example, risk identifier 104 of computer system 100 may be configured to calculate risk score 108 for different features or modules 122 of software application 121. The risk score 108 indicates a relative risk level for installing and using software application 121. As noted above, the software application 121 may be an application used in the medical field, or may be used by drug or medical device manufacturers, or may be used by other industries that must submit to regulatory compliance. This compliance ensures that the software is doing what it is supposed to, and is providing the proper results. This helps to ensure that medications, pacemakers, and other such items are manufactured and distributed in the proper fashion, leading to healthier patients countrywide.

In at least one embodiment, the computer system 100 is capable of automatically calculating a risk score. For example, each feature within the software application 121 may be associated with a particular executable within the software application 121. Each executable may be associated with a public variable that indicates the type of actions the executable performs. For instance, a particular feature may be used to access clinical records from a remote database. The executable associated with that particular feature may comprise a public variable indicating that it accesses clinical records. As such, when using any of the methods disclosed herein to identify features that have been updated, the computer system 100 can also identify the types of actions associated with each feature.

The identified actions can further be used to identify a relative risk level associated with the updated features. For example, any features that access clinical records may be rated as high-risk levels. In contrast, features that merely deal with local user interface preferences may be rated as low-risk features. Accordingly, in at least one embodiment, the computer system 100 can first identify which features were changed, then identify the functions of the changed features, and finally identify a relative risk associated with each changed feature.

Using traditional techniques, the compliance process may take many days, weeks or months, depending on the size of the software application. Using the embodiments herein, a company may be fully compliant with software regulations, while only taking a fraction of the previous time. Indeed, when implementing the use-based embodiments described herein, compliance tests may be performed in minutes or hours instead of days or weeks. Such testing uses dramatically fewer computing resources including CPU cycles, memory space, storage space, networking bandwidth, and human resources used to run and monitor the compliance tests.

Returning to FIG. 5, method 500 next includes performing internal usage testing to determine how the software application is recommended for use (520). This internal usage testing identifies how the software developer intends the application 121 to be used. Each application feature or function 122 is typically designed to perform a specific task or series of tasks. The testing interface 107 may perform internal usage testing to identify which features or modules are to be used for which purposes. The testing module 108 may also be configured to conduct use tests 109 to determine how a specified client uses the features 122 of the software application 121 as compared to the determined recommended use (530). If the client is determined to be using the application features in a manner outside of the recommended manner, that may indicate that the client is at higher risk for failing the established standard for compliance. Conversely, if the client is determined to be using the application features in a manner that is in line with the recommended manner, this may indicate that the client is at lower risk for failing compliance testing.

Based on this information including the calculated risk 108 and the determined use of the features 122, method 500 includes providing a recommendation 111 for the specified client 115 indicating which portions 112 of the software application 121 are to undergo client-specific validation (540). Thus, based on the client's usage of the features 122, features are or are not recommended for client specific validation. Or, in some cases, features are recommended for different levels of validation. For instance, if a client is heavily using a given feature, and is using it in a way that was not intended by the developer, that feature will be subject to a higher level of validation testing. If a client is heavily using a feature that is highly linked to other features (see FIG. 3), that feature will be subject to a higher level of testing. If a client is using, for example, a reporting feature designed to generate reports that are turned in to the federal government, that feature is highly important to the client and, as such, will be subject to a higher level of testing. Of course, the opposite is also true for the examples above and, in such cases, even less or possibly no client specific validation testing is performed, thereby saving time and resources.

This focusing and narrowing in on the most important features to a specific client is helpful in reducing the overall amount of validation testing that needs to be performed. Once the recommendation 111 has been generated, the identified features 112 can be validated by the validation module 113, and the results thereof 114 may be sent to the client. The client may rest assured that the features and software modules most important to them and their business have been tested and validated. Thus, the client may feel confident in switching to a newer version, knowing that the application features most used and most important to them have been thoroughly validated and found to be functional.

In some embodiments, as part of the testing and validating process, when a client is looking to upgrade from a prior version of an application to a newer version of the application (see FIG. 2), the client 115 may provide (via input 116) an indication of which software application features are important to them. This indication may include a list of identified critical business practices (CBPs) for that client. The software application 121 (or suite of applications) provides functionality including routines and modules that carry out and perform their CBPs. These critical business practices may be mapped to specific features 122 in the application. The risk identifier 104 may take the client's indication of CBPs into consideration, noting that any feature that performs a business-critical task for that client is a high risk to that client (i.e. the client needs that feature to work). This can be reflected in the client risk score 106. The risk identifier 104 can then look to see whether that feature or set of features has changed between versions (see FIG. 2) and how interconnected the feature is (see FIG. 3). The results of this determination make up the software risk score 105.

Thus, in this manner, the client's provided indication of CBPs can greatly assist the risk identifier 104 in generating an accurate overall risk score 108 that reflects the client's actual use of the software. This risk score is a determining factor when deciding which software features to test, and which to skip. This process ensures that some features can be skipped, resulting in faster compliance testing, and that those software features related to the client's CBPs operate at a minimum threshold level of effectiveness.

In order to identify defects prior to a software application version release, the embodiments herein may implement transfer performance qualifications (TPQs). The TPQs may include indicators that highlight qualifications that need to be met in a new version of the application. TPQs may be updated and re-executed for each software version release, ensuring that enhancements to software functions are included in the validation.

The TPQs may be used, for example, when determining software risk 105. The software risk, which indicates the risk or likelihood that a given software feature will fail to operate as intended in a newer version of an application, may be determined during an initial assessment of an application. The software risk includes determining any one or more of the following: 1) the degree to which a specified software component is included in a best practice configuration for the software application, 2) the degree to which a failure of a given software component would prevent standard usage of the software application, or 3) the degree to which the software feature or module was tested during software operation functional testing. Each of these indicators may be used individually, or in combination with other indicators, to determine the software risk 105.

The initial assessment of risk performed by the risk identifier 104 may also include determining client risk 106. The client risk may be determined by analyzing the current and updated versions of the application and identifying at least one of the following: 1) the amount of variation from a specified set of best practices for software application usage (i.e. the developer's intended use), 2) an amount of regulatory sensitivity (e.g. how sensitive is the information handled by this component of the application), 3) a subjective risk assessment performed by the client indicating the relative level of risk to the client, perhaps based on the client's past experiences, or 4) an internal usage testing risk intended to determine how often or the extent to which the client uses certain functions. The overall risk score 108 is then indicated by the combined software risk score 105 and the client risk score 106, although it will be recognized that, at least in some embodiments, the risk score 108 may be solely based on the software risk or the client risk. The risk score 108 may be automatically calculated for each new version of the application as the versions are released.

In order to help the client better understand their current level of upgrade risk, the computer system 100 may generate a risk presentation tailored specifically to that client. The risk presentation may be a user interface, report, slide deck or other presentation that shows a personalized risk for the software application based on their particular usage of the application. The risk presentation indicates how the risk score was calculated, including showing equations, formulas, figures, flowcharts, audits or other means of conveying how the risk score was derived. The risk presentation, as well as any recommendations provided by the recommendation module 110, may be generated and provided in a format specified by the user. Thus, the client may have full control over how reporting is performed.

In some embodiments, a change control module 125 may be provided in computer system 100. The change control module is configured to provide a change control interface that allows users to manage software changes, including installations and upgrades, in a controlled manner. The change control module 125 may provide functionality that allows user to select which changes are applied, or which applications are upgraded, and to which version. In this manner, clients may also have control over which versions are actually applied to their systems. Thus, even while receiving recommendations that are tailored to the unique regulatory requirements of the client's business, the client may still decide not to perform recommended validation tests, or may decide to perform additional tests, at their discretion. For example, if a client has received previous warning letters from a government agency regarding a certain feature, the client may elect to run extra tests directed to that feature. Other areas of lesser importance may be omitted. In contrast, in at least one embodiment, the change control module 125 requires that a user accept all changes in a given upgrade.

Additionally or alternatively, if a client is less sensitive to a certain feature, they may opt to simply leverage the developer's internal testing as its own. For instance, if a developer creating a software application performs internal testing against a specified use of their software, and the client uses the software in the same way, the client may be satisfied with the developer's internal testing, and may elect to omit client specific validation testing on the feature. The client may then be able to comfortably get by with testing only those areas that have been altered, or are subject to differing use by the client.

If, in some cases, calculations indicate that risks are higher than anticipated, the computer system 100 may provide a recommendation of best practices to the client. These recommendations may indicate, for example, that further testing is advised. The computer system may be configured to evaluate multiple risks, including software usage, impact of failure, regulatory requirements, variation from best practices, testing mitigations, and other risks, and determine a personalized risk to the client, based on their usage of the software. In some cases, new software application features may be analyzed for risk before inclusion in a new software application version. This pre-inclusion analysis may further reduce risk to the client, as testing has been performed before even including the feature in the application.

In some embodiments, the risks are generated using specific calculations. For example, in one embodiment, Initial Risk=Software Risk+Client Risk, where Software Risk=(Conformance to Standard Configuration+Impact of Failure)−operational qualification (OQ) Testing (i.e. use cases 109), and Client Risk=(Variation from Best Practice+Regulatory Impact+Client Assessment)−Usage (TPQ) Testing. Additionally or alternatively, Change Risk=Software Risk+Client Risk where Software Risk=(Complexity of code change+size of code change+Touch points of code+Frequency of occurrence)−OQ Testing and Client Risk= (Variation from Best Practice+Regulatory Impact+Client Assessment)−Usage (TPQ) Testing. In at least one embodiment, these rules may be altered or implemented as needed on a per-client basis.

Turning now to FIG. 6, a flowchart is illustrated of a method 600 for applying change control when upgrading a software application. The method 600 will now be described with frequent reference to the components and data of environment 1000 of FIG. 1.

Method 600 includes comparing first and second versions of a software application to identify differences in features and functionality between the first and second versions (610). For example, computer system 100 of FIG. 1 may compare software application version A (201) of FIG. 2 with version B (202) to identify differences in features and functionality between the two versions. As noted in FIG. 2, for example, some features such as X and Y are updated, while feature Z is unchanged between versions. The computer system then determines whether the identified differences affect software modules or features that are integrated in the application beyond a threshold amount (620). As shown in FIG. 3, some features may be linked to many other features, while some features are relatively isolated. The less interconnected a feature is, the less likely it is that upgrading that feature will break other features in the application. Thus, the computer system identifies whether features that are going to be upgraded between versions are highly or only mildly integrated with other features of the application.

Method 600 next includes performing internal usage testing to determine how the first version of the application is recommended for use (630). The testing interface 107 of computer system 100 may conduct tests to determine, for example, how the developers of software application 121 intend their application to be used, and may also perform use tests 109 to determine how the software application is actually used by the client 115. Then, based on the usage testing results and the identified level of integration, the recommendation module 110 determines which portions of the second version of the application are to undergo client specific validation (640), and recommends those portions of the second version of the application for validation (650). The validation module 113 then validates the recommended portions of the application.

When determining the level of integration for a given feature, the risk identifier 104 may be configured to identify how many connections or logic paths the software feature has to other features or modules. If a feature that is being updated between versions has a high number of connections or logic paths, the risk associated with that feature will be increased. If the user heavily uses that feature (see FIG. 4), the risk level will be further increased. In some cases, if an updated version of an application is released, the computer system 100 may be configured to automatically identify which software modules or features have changed from the initial version to the updated version, and for those software modules or features that have changed, determine how integrated the software modules or features are. Using this information, the computer system 100 may provide a recommendation indicating which software modules or features should be validated before moving to the updated version.

In some cases, features are only recommended for validation testing if they have changed beyond a certain threshold, or if the client uses the feature beyond a specified threshold. This can reduce the number of client specific validation tests performed. Instead of validation testing every module on every upgrade, the system can look at what has changed, look at how many logic paths or connections are involved to determine how integrated the upgraded features are, perform usage testing to identify how the client is using the features, and only recommend doing upgrade client specific validation testing if it is really necessary. Only when a module or feature has been identified as having changed from the first version to the second version, as is sufficiently connected, and as is sufficiently used by the user will the feature be tested.

When validation testing is performed, the computer system 100 may track the testing and generate validation results 114, which are sent to the client. The results may be in the form of a report, in a spreadsheet, or in some other form. The results presentation may include pertinent information from any or all documents in a validation package, including scripts, list of expected results, timeline, identified deliverables, user requirements, upgrade risk assessment on both the project level as well as system level, etc. This information is combined into a single change control form, and that change control form is used to document new features (i.e. features that are updated between versions). Any bugs that results from the validation testing can be logged in the change control form. That form can also be used as a summary report which shows each step taken during validation process. This further reduces the time needed for reporting on the validation testing itself, thereby also contributing to the increased efficiencies provided by the embodiments described herein.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for performing risk-based software validation, the method comprising:
   calculating a best-practices score by executing a first self-audit feature within a software application, wherein the first self-audit feature comprises a function built within the software application that examines the software application to determine if best practices are in place;
   calculating a regulatory sensitivity score by executing a second self-audit feature within the software application, wherein the second self-audit feature comprises a function built within the software application that examines the software application to determine if features are being used in manners that invoke regulatory oversight;
   calculating a risk score for one or more features in a software application, the risk score accounting for the best-practices score and the regulatory sensitivity score;
   conducting a use test to determine how a specified client uses the one or more features of the software application as compared to a determined recommended use, wherein conducting the use test comprises:
      each time a target feature is utilized incrementing a counter within a storage object, and
      each time a target feature is utilized registering a function that called the target feature; and
   based on the calculated risk score and the determined client use of the one or more features, providing a recommendation for the specified client indicating which portions of the software application are to undergo client-specific validation.

2. The method of claim 1, wherein the first self-audit feature performs a method comprising:
   determining whether a best practice of requiring two-factor authentication is in place; and
   accounting for the presence of two-factor authentication when calculating the best-practices score.

3. The method of claim 1, wherein the first self-audit feature performs a method comprising:
   weighting different best practices differently; and
   accounting for the weighting when calculating the best-practices score.

4. The method of claim 1, wherein the second self-audit feature performs a method comprising:
   determining that an export feature is being used to export data that contains personal medical records;
   rating the export feature as having a high regulatory sensitivity; and
   accounting for the weighting when calculating the regulatory sensitivity score.

5. The method of claim 1, further comprising:
   identifying that an update of the software application has been installed;
   performing a hash of each individual executable within the updated software application; and
   comparing the hashes of each individual executable within the updated software application to hashes of each individual executable within the software application before the software application was updated.

6. The method of claim 5, further comprising:
   identifying that an update of the software application has been installed by accessing a public variable associated with the software application, wherein the public variable indicates a version number of an associated executable.

7. The method of claim 6, further comprising:
   accessing a remote database and downloading a list of changes associated with a new version of the associated executable.

8. A computer system for applying change control when upgrading a software application comprising:
   one or more processors; and
   one or more non-transitory computer-readable media having stored thereon executable instructions that when executed by the one or more processors configure the computer system to perform at least the following:
      calculate a best-practices score by executing a first self-audit feature within a software application, wherein the first self-audit feature comprises a function built within the software application that examines the software application to determine if best practices are in place;
      calculate a regulatory sensitivity score by executing a second self-audit feature within the software application, wherein the second self-audit feature comprises a function built within the software application that examines the software application to determine if features are being used in manners that invoke regulatory oversight;
      calculate a risk score for one or more features in a software application, the risk score accounting for the best-practices score and the regulatory sensitivity score;
      conduct a use test to determine how a specified client uses the one or more features of the software application as compared to a determined recommended use, wherein conducting the use test comprises:
         each time a target feature is utilized incrementing a counter within a storage object, and
         each time a target feature is utilized registering a function that called the target feature; and
      based on the calculated risk score and the determined client use of the one or more features, provide a recommendation for the specified client indicating which portions of the software application are to undergo client-specific validation.

9. The computer system of claim 8, wherein the first self-audit feature is configured to:
   determine whether a best practice of requiring two-factor authentication is in place; and
   account for the presence of two-factor authentication when calculating the best-practices score.

10. The computer system of claim 8, wherein the first self-audit feature is configured to:
    weight different best practices differently; and
    account for the weighting when calculating the best-practices score.

11. The computer system of claim 8, wherein the second self-audit feature is configured to:
- determine that an export feature is being used to export data that contains personal medical records;
- rate the export feature as having a high regulatory sensitivity; and
- account for the weighting when calculating the regulatory sensitivity score.

12. The computer system of claim 8, wherein the executable instructions include instructions that are executable to configure the computer system to:
- identify that an update of the software application has been installed;
- perform a hash of each individual executable within the updated software application; and
- compare the hashes of each individual executable within the updated software application to hashes of each individual executable within the software application before the software application was updated.

13. The computer system of claim 12, wherein the executable instructions include instructions that are executable to configure the computer system to:
- identify that an update of the software application has been installed by accessing a public variable associated with the software application, wherein the public variable indicates a version number of an associated executable.

14. The computer system of claim 13, wherein the executable instructions include instructions that are executable to configure the computer system to:
- access a remote database and download a list of changes associated with a new version of the associated executable.

15. One or more non-transitory computer-readable media that store computer-executable instructions that, when executed, implement a method for applying change control when upgrading a software application, the method comprising:
- calculating a best-practices score by executing a first self-audit feature within a software application, wherein the first self-audit feature comprises a function built within the software application that examines the software application to determine if best practices are in place;
- calculating a regulatory sensitivity score by executing a second self-audit feature within the software application, wherein the second self-audit feature comprises a function built within the software application that examines the software application to determine if features are being used in manners that invoke regulatory oversight;
- calculating a risk score for one or more features in a software application, the risk score accounting for the best-practices score and the regulatory sensitivity score;
- conducting a use test to determine how a specified client uses the one or more features of the software application as compared to a determined recommended use, wherein conducting the use test comprises:
  - each time a target feature is utilized incrementing a counter within a storage object, and
  - each time a target feature is utilized registering a function that called the target feature; and
- based on the calculated risk score and the determined client use of the one or more features, providing a recommendation for the specified client indicating which portions of the software application are to undergo client-specific validation.

16. The one or more non-transitory computer-readable media of claim 15, wherein the first self-audit feature performs a method comprising:
- determining whether a best practice of requiring two-factor authentication is in place; and
- accounting for the presence of two-factor authentication when calculating the best-practices score.

17. The one or more non-transitory computer-readable media of claim 15, wherein the first self-audit feature performs a method comprising:
- weighting different best practices differently; and
- accounting for the weighting when calculating the best-practices score.

18. The one or more non-transitory computer-readable media of claim 15, wherein the second self-audit feature performs a method comprising:
- determining that an export feature is being used to export data that contains personal medical records;
- rating the export feature as having a high regulatory sensitivity; and
- accounting for the weighting when calculating the regulatory sensitivity score.

19. The one or more non-transitory computer-readable media of claim 15, further comprising:
- identifying that an update of the software application has been installed;
- performing a hash of each individual executable within the updated software application; and
- comparing the hashes of each individual executable within the updated software application to hashes of each individual executable within the software application before the software application was updated.

20. The one or more non-transitory computer-readable media of claim 19, further comprising:
- identifying that an update of the software application has been installed by accessing a public variable associated with the software application, wherein the public variable indicates a version number of an associated executable.

* * * * *